United States Patent
Delbeke et al.

(10) Patent No.: US 6,224,992 B1
(45) Date of Patent: May 1, 2001

(54) COMPOSITE BODY PANEL AND VEHICLE INCORPORATING SAME

(75) Inventors: Robert Delbeke, Livonia, MI (US); Roy A. Hambric, Lancaster, PA (US); Robert F. Mallon, Northville, MI (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 09/249,736

(22) Filed: Feb. 11, 1999

Related U.S. Application Data

(60) Provisional application No. 60/074,517, filed on Feb. 12, 1998.

(51) Int. Cl.[7] .............................. B32B 15/00; B21C 23/24
(52) U.S. Cl. .............................. 428/654; 29/904; 72/46; 148/535; 148/537; 296/191; 427/154; 427/156; 427/209; 427/210; 428/686; 428/687; 428/457
(58) Field of Search ..................................... 428/654, 686, 428/687, 457; 148/535, 537; 296/191; 29/527.2, 904; 72/46; 427/154, 156, 209, 210

(56) References Cited

U.S. PATENT DOCUMENTS 4,082,578 * 4/1978 Evancho et al. ..................... 428/654
5,213,639 * 5/1993 Colvin et al. ........................ 428/654

OTHER PUBLICATIONS

"Metals Handbook: Desk Edition," Boyer and Gall, editors; American Society for Metals, Metals Park, Ohio; p. 26–40, May 1985.*

* cited by examiner

*Primary Examiner*—Deborah Jones
*Assistant Examiner*—Robert R. Koehler
(74) *Attorney, Agent, or Firm*—Thomas R. Trempus

(57) ABSTRACT

The invention is a composite body panel, a sheet product from which the composite body panel is formed, and a vehicle incorporating at least one such composite body panel thereon. The composite body panel includes a substrate having an inner and an outer surface. A lamination is applied to at least the inner and, in an alternative embodiment, the outer surfaces of the substrate. The lamination includes a material having a uniform surface which is well suited for formation, but which is not as strong as the substrate. The formation of the composite body panel further includes the step of applying a coating to the lamination, and then, forming the substrate/lamination/coating material into the desired shape.

18 Claims, 2 Drawing Sheets

COMPOSITE BODY PANEL AND VEHICLE INCORPORATING SAME

CROSS REFERENCE TO RELATED APPLICATION

This application claims priority form U.S. Provisional Patent Application Ser. No. 60/074,517, having a filing date of Feb. 12, 1998.

BACKGROUND OF THE INVENTION

1. Field of the Invention

This invention relates in general to vehicle body panels, and in particular to composite body panels made from laminations of differing materials, specifically, different aluminum alloys.

2. Background Art

It is the conventional practice in the transportation industry to form body panels, such as deck lids and fenders, by stamping sheet metal. Typically, the transportation industry has utilized steel sheet stock for the production of body panels. In particular, the transportation industry has specified high-strength, low-alloy, cold rolled P & O premium steel for body panels. These panels are resistant to denting and provide a quality surface for the application of paint. However, these panels are comparatively heavy, and as such, have an adverse effect on the weight of the vehicle, and, in turn, the fuel economy thereof However, as CAFÉ (Corporate Average Fuel Economy) requirements become more and more difficult to meet, there has been a need to address various strategies for reducing the overall weight of vehicles. This has resulted in efforts to light-weight the body-in-white, the drive train and suspension components, and the vehicle body panels. Within these three broad categories, the transportation industry has turned from steel to light metals and plastics. Thus, the use of aluminum in the transportation industry has steadily increased. For example, in 1991, the average amount of aluminum in passenger cars was 191 pounds. By 1996, this value grew to 252 pounds, which represents an increase of 32%. A significant amount of light weight aluminum products, particularly sheet products have been used as inner and outer body panels.

As described above, aluminum alloy sheet products have been substituted for steel body panels. Some aluminum alloys have long been identified by the Aluminum Association as 1000, 3000, 4000, 5000, and 6000 series alloys. These alloy series have also been known as, for example, 1XXX, 3XXX, etc. The 1000 or 1XXX series aluminum alloys are characterized by excellent corrosion resistance, high thermal and electrical conductivity, low mechanical properties and excellent workability. Iron and silicon are the major impurities. The 5000 series aluminum alloys possess good welding characteristics and good resistance to corrosion. Magnesium is one of the most effective and widely used alloying elements of the series. The 6000 series aluminum alloys contain silicon and magnesium and are heat-treatable and versatile. The references in this specification to several alloy series are to be understood as those alloy series as defined by the Aluminum Association in its "Aluminum Standards and Data" handbook. To date, in the United States, automakers have approved only the 6xxx T4 and T6 alloys for use in the production of body panels. These heat treated alloys are quite expensive, but they are capable of stretching and forming without stretch and strain deformations, and are likewise suitable for Class A finishes. Other sheet alloy products offer potential, but do present certain drawbacks. For example, it has been proposed to use of the 5000 series aluminum alloys for body panels because it demonstrates better formability with a higher corrosion resistance and lower manufacturing costs than current heat treatable alloys. Unfortunately, the use of these alloys has been hampered by its tendency to produce stretcher strain lines, also known as Luder lines, when stamped into panels. While some 5xxx alloys have been approved for automobile production in Japan, it remains quite difficult to obtain the proper surface finish on this material. As such, these alloys have only been used for certain specialized applications, where finish is not critical.

It has been suggested that the Ludering phenomenon of 5000 series alloys in outer body panels can be combated by several strategies, for example, a continuous annealing line (CAL), obtaining a larger grain size, or applying a pre-strain into the panel before the final stamping form is given to the panel. Unfortunately, all of these strategies are very costly.

While reference is made to automobiles and the automobile industry, it is to be understood that the present invention is not limited to body panels in automobiles, but rather has applications with other areas of stamping and metalworking.

SUMMARY OF THE INVENTION

The invention is a composite body panel, a sheet product from which said composite body panel is formed, and a vehicle incorporating composite body panels. The composite body panel comprises a substrate having an inner and an outer surface; a lamination applied to at least one of the inner and outer surfaces of the substrate, the lamination comprising a material having an improved surface finish as compared to the substrate, but having a strength lower than the substrate. In an alternative embodiment, both the inner and outer surfaces of the substrate include a lamination applied thereto. The substrate is an aluminum alloy sheet product in which the alloy is selected from the 5XXX series alloys. The lamination applied to at least one of the inner and outer surfaces of the substrate is an aluminum alloy sheet product in which the alloy is selected from the 1XXX series alloys. The composite body panel has inner and outer working surfaces and at least one of these working surfaces has a coating of lubricant thereon.

The composite body panel of this invention is typically formed from a sheet product comprising a substrate having an inner and an outer surface; a lamination applied to at least one of the inner and outer surfaces of the substrate, the lamination comprising a material having an improved surface finish as compared to the substrate, but having a strength lower than the substrate. The aluminum alloy composite sheet product may, in an alternative embodiment, include in both the inner and outer surfaces of the substrate, a lamination applied thereto. The aluminum alloy composite sheet product substrate is an aluminum alloy sheet product in which the alloy is selected from the 5XXX series alloys. The aluminum alloy composite sheet product lamination applied to at least one of the inner and outer surfaces of the substrate is an aluminum alloy sheet product in which the alloy is selected from the 1XXX series alloys. Additionally, an inner and outer working surfaces of the sheet product may include a coating of lubricant thereon.

The invention also provides a method of producing a composite body panel comprising the steps of: laminating at least one of an inner and outer surface of a substrate with a lamination, the lamination comprising a metal material having an improved surface finish as compared to the substrate, but having a strength lower than the substrate;

applying a coating to at least a portion of the lamination; and forming the substrate having the lamination and the coating into the desired shape. According to this method both the inner and outer surfaces of the substrate can have a lamination thereon. Alternatively, only one of the surfaces may include a laminate. According to this method, the substrate is selected from an aluminum alloy sheet product from the 5XXX series alloys. The laminate is selected from an aluminum alloy sheet product from the 1XXX series alloys.

This invention teaches the use of the composite body panel in a vehicle. Accordingly, at least one of the vehicle's body panels comprise a substrate having an inner and an outer surface; a lamination applied to at least one of the inner and outer surfaces of the substrate, the lamination comprising a material having an improved surface finish as compared to the substrate, but having a strength lower than the substrate. In alternative embodiments, either one or both surfaces of the substrate can include the laminate. The substrate is an aluminum alloy sheet product in which the alloy is selected from the 5XXX series alloys. The lamination applied to at least one of the inner and outer surfaces of the substrate is an aluminum alloy sheet product in which the alloy is selected from the 1XXX series alloys.

It is therefore an object of this invention to utilize a 5000 series alloy in outer body panels through the use of a clad alloy in the 1000 series in order to mask the Luder lines for enhanced surface appearance and finish.

It is also an object of this invention to provide a clad sheet product demonstrating Luder free forming characteristics with optimized strength and depth of draw characteristics.

It is yet another object of this invention to utilize different combinations of 5000 series alloys and tempers with the alternative clad alloys to produce a product having desirable levels of formability, weldability, surface quality, and dent resistance.

It is another object of this invention to provide a clad sheet product that demonstrates a suppression of surface crack initiation due to the incorporation of a softer more elastic outer clad alloy.

It is still another object of this invention to provide enhanced corrosion protection along with ease of recycling in a sheet product for body panels.

BRIEF DESCRIPTION OF THE DRAWINGS

The above as well as other features of this invention can be appreciated through consideration of the Detailed Description of the Invention in conjunction with the several drawings in which.

DETAILED DESCRIPTION OF THE INVENTION

Figure 1:
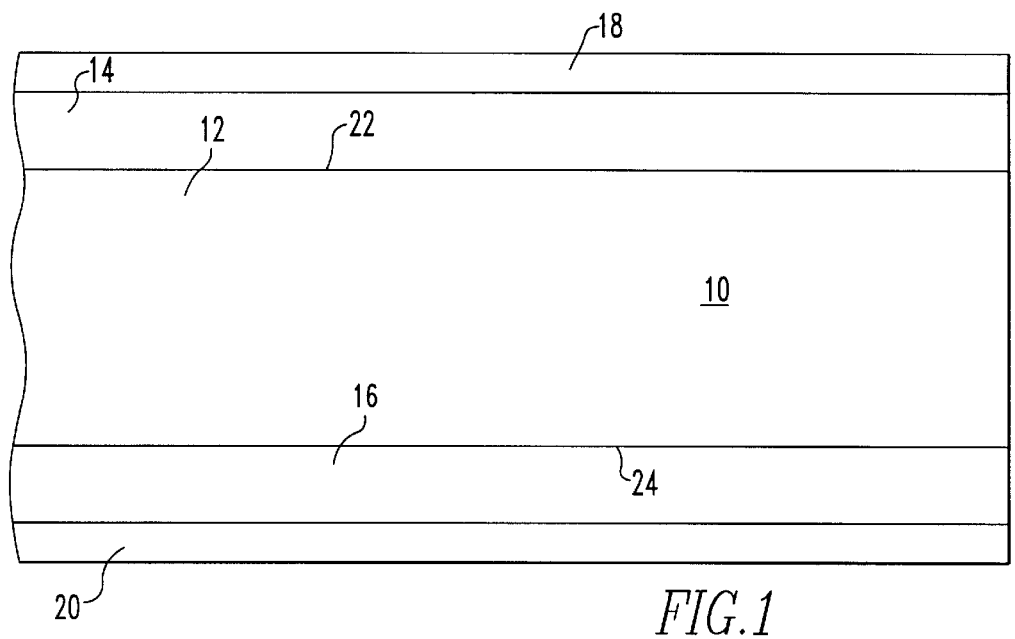
FIG. 1 is a partial cross-sectional view of a composite body panel according to one embodiment of this invention.

Turning to FIG. 1, a first embodiment of the present invention is shown in partial cross section. A composite body panel, generally indicated by the reference character 10 comprises a substrate 12, inner surface lamination 14, outer surface lamination 16, inner surface coating 18 and outer surface coating 20. Substrate 12 includes inner surface 22 and outer surface 24. Generally, substrate 12 may comprise a 5xxx aluminum of varying thickness. Such an alloy has excellent elongation (over 20%) for forming and has high yield properties for dent resistance of 17K to 28K depending on the particular alloy. For example, in the production of automotive body panels, while not limited to such a construction, the substrate may comprise an AA 5052 H111 alloy that is between 0.030" and 0.038" thick.

The composite body panel of this invention is formed by a conventional process know as cladding. Cladding is the metallurgical bonding of two different series aluminum alloys into one roll formed sheet. This 'composite' sheet will stamp, form and handle as any other coil sheet. An example of a composite or clad alloy is shown in FIG. 1. The mechanism behind this process is the cladding of a softer aluminum alloy on top of the 5000 series alloy. This process eliminates Type A and B Luder lines during forming.

Inner surface lamination 14 is laminated to inner surface 22 of substrate 12. Similarly, outer surface lamination 16 is bonded to outer surface 24 of substrate 12. Each lamination generally comprises a 1xxx alloy of varying thickness. In particular, 1xxx alloys have excellent formability, corrosion resistance and a uniform surface finish, suitable for application of a Class A finish. For example, each of the inner and outer surface laminations 14, 16, respectively, may comprise AA 1145 which is between 0.004" and 0.006" thick. Such a thickness generally comprises about 12% of the thickness of the total thickness of the material. Of course, the inner and outer surface laminations may comprise different materials, and materials other than 1xxx alloys have been contemplated for lamination.

Inner and outer surface coatings 18 and 20, respectively, are applied to each of the inner and outer surface laminations 14, 16 respectively. The coatings may comprise a dry lube. The dry lube protects the surface of the lamination during stretch forming and assembly operations. The dry lube is then removed after the formation processes. For example the dry lube may comprise an environmentally friendly polymer which is water soluble and, in turn, rapidly removable prior to painting. The weight of the dry lube is approximately 250 Mg/ft². Of course, other coatings which provide protection to the lamination surface during the formation operation are likewise contemplated for use.

Figure 2:
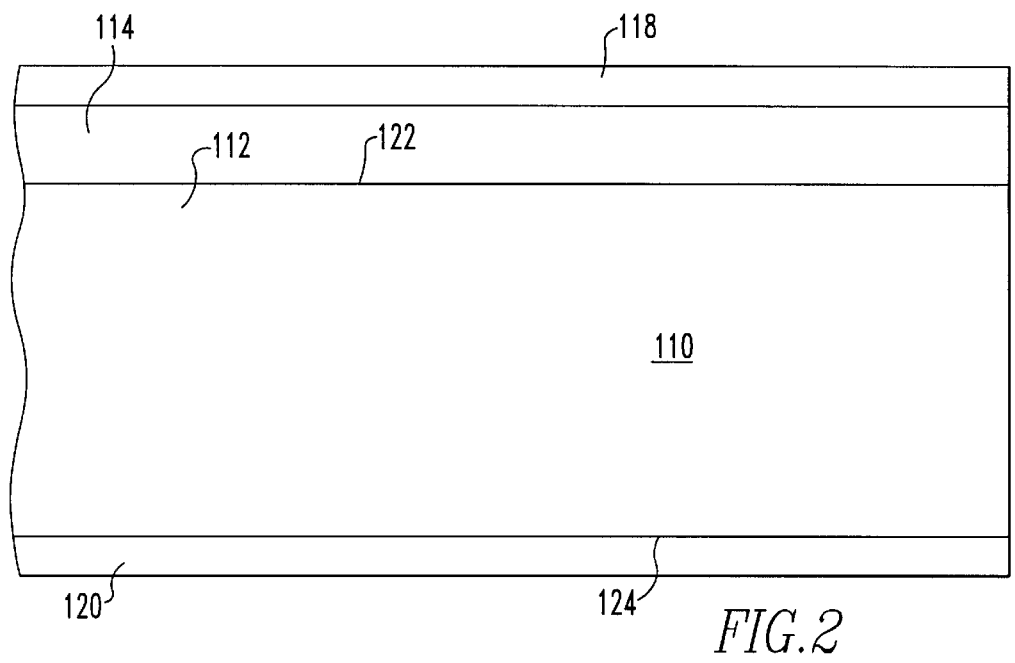
FIG. 2 is a partial cross sectional view of a composite body panel according to an alternative embodiment of this invention.

Turning to FIG. 2, there is shown an alternative embodiment of the instant invention in which the composite material generally indicated by the reference character 110 comprises a substrate 112 with only one laminated surface, as at 114, an inner surface coating 118 and outer surface coating 120. Substrate 112 includes inner surface 122 and outer surface 124. Generally, substrate 112 may comprise a 5xxx aluminum of varying thickness. Such an alloy has excellent elongation (over 20%) for forming and has high yield properties for dent resistance of 17K to 28K depending on the particular alloy. For example, in the production of automotive body panels, while not limited to such a construction, the substrate may comprise an AA 5052 H111 alloy that is between 0.030" and 0.038" thick. In all other respects, with the exception of incorporating only a single laminate member rather than the inner and outer laminate members as shown in the embodiment of FIG. 1, the alternative embodiment of FIG. 2 utilizes the alloys and is believed to demonstrate the improved characteristics of the embodiment shown and described in conjunction with FIG. 1.

Figure 3:
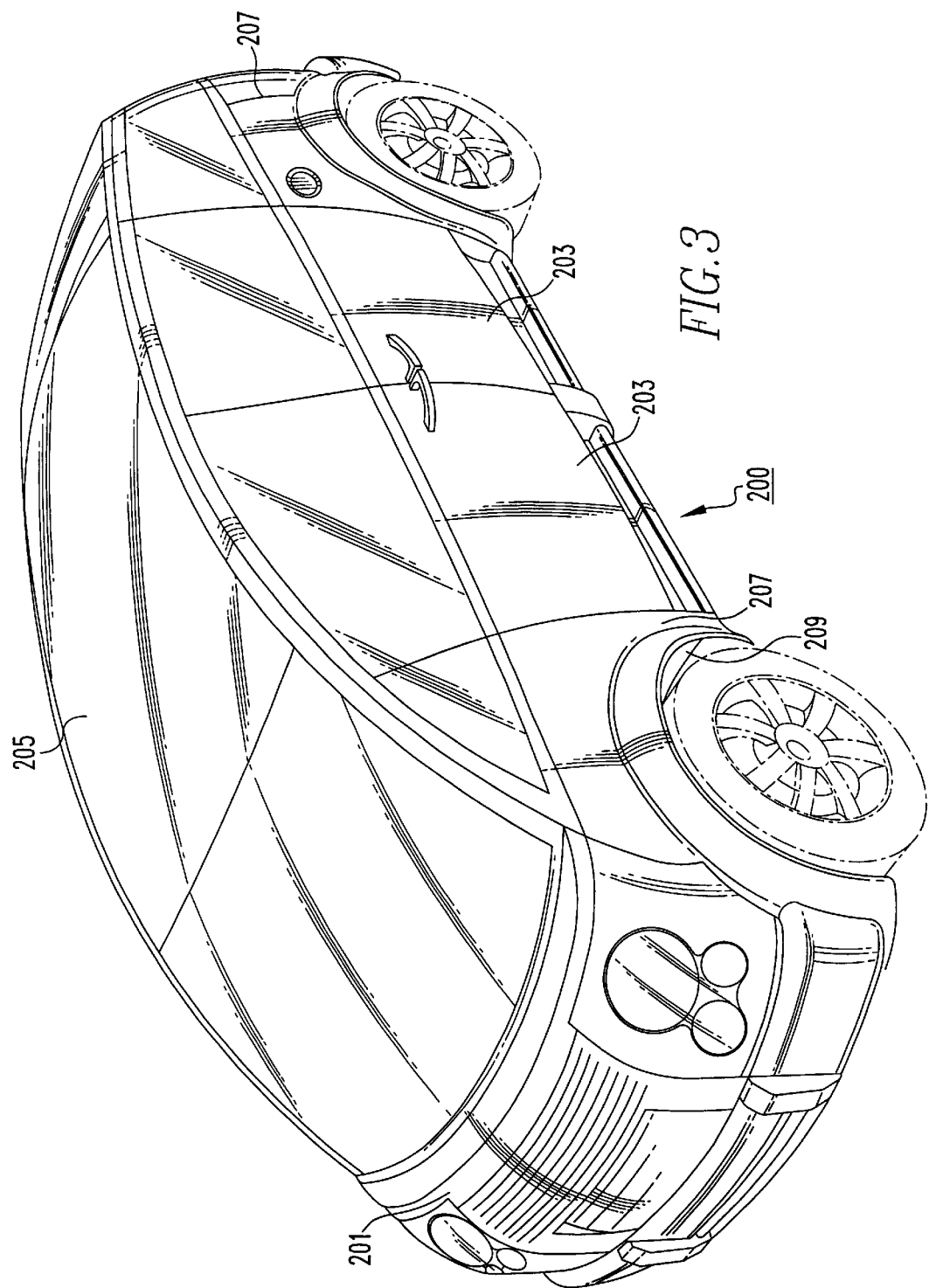
FIG. 3 is a front perspective view of an automobile incorporating at least one composite body panel according to the teachings of this invention.

As shown in FIG. 3, a vehicle may be manufactured to incorporate the composite sheet product of this invention in various body panels. The vehicle, generally indicated by the reference character 200, is but one example of the virtually countless styles of automobiles that are commercially available. The vehicle 200 is representative of multi-purpose vehicles or sport utility vehicles and includes various body panels, such as hood 201, door panel 203, roof panel 205, and fender 207. Any of these several outer panels as well as any of the inner panels, such as those which form the interior of the wheel wells 209, may be formed from the composite sheet product 10 and 110 of this invention. The composite sheet product (10 and 110) is stamped, by commercially available stamping presses into the desired component profile for subsequent assembly.

When performing a stamping of such a composite body panel, depending on the particular materials used, the operational sequence of preparing the composite body panel for stamping is important. A coil of a 5xxx substrate having a 1xxx lamination on either side thereof should preferably be straightened before the application of the dry lube coating. After coating, the sheet is sheared into a body panel blank. It is contemplated that certain coatings can be applied prior to the coiling of the laminate, and, thus the coils may be shipped in condition for shearing and immediate formation.

Through use of such a composite body panel, as illustrated in FIGS. 1 and 2, considerable weight savings may be achieved. It is estimated that such savings may be in the order of between 40% and 65% of the weight inherent in conventional steel sheet body panels for a given application. In addition, the material is an economical substitute for steel body panels currently in production. In particular, the laminate unites the surface quality of a 1xxx lamination with the strength of 5xxx substrate to create a composite body panel having both high impact standards and a uniform surface finish that can be formed in conventional high speed mills and variable draw dies, even with irregular surfaces of body panel geometries.

It is believed that the clad material of this invention will demonstrate superior formability in the production of body panels. For example, during stamping and drawing, the majority of cracks initiate at the surface and propagate inward. The presence of the softer more elastic outer alloys (14, 16, and 114) tends to suppress surface crack initiation. This permits more severe deformation without failures. Thus more dramatic styling features may be designed into aluminum sheet body panels. Many different combinations of alloys may be utilized for optimum design of each particular product. These alloys may be classified into deep draw, medium draw and shallow draw products.

The amount a body panel deforms in dent resistance is largely a function of its yield strength. A typical requirement of automotive panels is a minimum yield strength value of about 130 MPa. The following formula illustrates a calculation for determining the equivalent dent resistance between aluminum and steel sheet products:

$$Ta = \Sigma ys$$

$$Ts = \Sigma ya$$

where:

Ta, Ts=thickness of aluminum and steel, respectively $\Sigma ya$, $\Sigma ys$=yield strength of aluminum and steel, respectively.

The composite product of the instant invention has an advantage in dent resistance over heat treatable alloys in its versatility. If greater strength is required, the mechanical properties of the core (12 and 112) can be altered, the temper of the core can be changed, or the percentage of liner ((14, 16, and 114) to core can be reduced.

The Aluminum Association publishes weldability ratings for standard aluminum alloys. The alloys contemplated by this invention for use as body panel inners and outers are typically given an A rating for gas, arc and resistance and spot welding applications. This A rating refers to general weldability by all commercial procedures or methods.

The composite aluminum material of this invention is characterized by extreme resistance to corrosion. The 5000 series core alloy is superior to 6000 series alloys in resistance to filiform corrosion. Also having a liner of 1145, which is a high purity aluminum alloy, will be extremely beneficial in resistance to corrosion.

Utilizing the optimum configuration of clad alloys should readily lend the sheet product of this invention to recycling goals and requirements. Both the core and liner are selected from common alloys and are readily recycled. Moreover, recycled composite scrap can be used to produce any 5000 series alloy with 2% or more magnesium.

The cost to manufacture aluminum clad alloys as disclosed herein is estimated to be less than that of commercially available heat-treated aluminum alloy sheet product. This is believed possible since the cost to roll, i.e., clad, the liner material to the core at the rolling mill is less than that required of a quench, heat-treat and quench operation. All properties are locked in at the rolling mill. No subsequent operations are needed to increase strength after forming such as a heat treat process.

It has been shown that the use of a 5000 series alloy can be used for automotive body panels without Luder lines present, by the addition of the proper Luder free liner to the core alloy. The enhanced formability of 5000 series aluminum is obtained which could allow the use of aluminum in deep drawn panels that have not been seen in the transportation industry. Corrosion resistance is improved over current production aluminum body panels, which could lead to cost savings in necessary treatments to provide corrosion resistance. Also, the composite is readily recycled, and can be grouped together with any common commercial scrap parts. Finally, the composite appears to be manufactured at a lower cost as compared to the current heat treatable products on the market today.

What has been described is an improved composite body panel, which is ideally suited for application in the transportation industry. The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. A composite body panel comprising:

a substrate comprising an aluminum alloy sheet product in which the alloy is selected from the 5XXX series alloys and having an inner and an outer surface;

a lamination applied to at least one of the inner and outer surfaces of the substrate, the lamination comprising a material having an improved surface finish as compared to the substrate, but having a strength lower than the substrate.

2. The composite body panel according to claim 1 wherein both the inner and outer surfaces of the substrate include a lamination applied thereto.

3. The composite body panel according to claim 1 wherein the lamination applied to at least one of the inner and outer surfaces of the substrate is an aluminum alloy sheet product in which the alloy is selected from the 1XXX series alloys.

4. The composite body panel according to claim 2 wherein the lamination applied to both the inner and outer surfaces of the substrate is an aluminum alloy sheet product in which the alloy is selected from the 1XXX series alloys.

5. The composite body panel according to claim 1 wherein the composite body panel comprises inner and outer working surfaces and at least one of said working surfaces has a coating of lubricant thereon.

6. A aluminum alloy composite sheet product comprising:
   a substrate comprising an aluminum alloy sheet product in which the alloy is selected from the 5XXX series alloys and having an inner and an outer surface;
   a lamination applied to at least one of the inner and outer surfaces of the substrate, the lamination comprising a material having an improved surface finish as compared to the substrate, but having a strength lower than the substrate.

7. The aluminum alloy composite sheet product according to claim 6 wherein both the inner and outer surfaces of the substrate include a lamination applied thereto.

8. The aluminum alloy composite sheet product according to claim 6 wherein the lamination applied to at least one of the inner and outer surfaces of the substrate is an aluminum alloy sheet product in which the alloy is selected from the 1XXX series alloys.

9. The aluminum alloy composite sheet product according to claim 7 wherein the lamination applied to both the inner and outer surfaces of the substrate is an aluminum alloy sheet product in which the alloy is selected from the 1XXX series alloys.

10. The aluminum alloy composite sheet product according to claim 6 wherein the composite body panel comprises inner and outer working surfaces and at least one of said working surfaces has a coating of lubricant thereon.

11. A method for producing a composite body panel comprising the steps of:
    laminating at least one of an inner and outer surface of a substrate comprising an aluminum alloy sheet product from the 5XXX series alloys with a lamination, the lamination comprising a metal material having an improved surface finish as compared to the substrate, but having a strength lower than the substrate;
    applying a coating to at least a portion of the lamination; and
    forming the substrate having the lamination and the coating into the desired shape.

12. The method according to claim 11 further including the step of laminating the other of said at least one of an inner and outer surface of the substrate with a lamination wherein both the inner and outer surfaces of the substrate have a lamination thereon.

13. The method according to claim 12 wherein the laminate is selected from an aluminum alloy sheet product from the 1XXX series alloys.

14. In a vehicle having body panels, at least one of said body panels comprising:
    a substrate comprising an aluminum alloy sheet product from the 5XXX series alloys and having an inner and an outer surface;
    a lamination applied to at least one of the inner and outer surfaces of the substrate, the lamination comprising a material having an improved surface finish as compared to the substrate, but having a strength lower than the substrate.

15. The vehicle having body panels according to claim 14 wherein both the inner and outer surfaces of the substrate include a lamination applied thereto.

16. The vehicle having body panels according to claim 14 wherein the lamination applied to at least one of the inner and outer surfaces of the substrate is an aluminum alloy sheet product in which the alloy is selected from the 1XXX series alloys.

17. The vehicle having body panels according to claim 16 wherein the lamination applied to both the inner and outer surfaces of the substrate is an aluminum alloy sheet product in which the alloy is selected from the 1XXX series alloys.

18. The vehicle having body panels according to claim 14 wherein the composite body panel comprises inner and outer working surfaces and at least one of said working surfaces has a coating of lubricant thereon.

* * * * *